US010739984B1

(12) United States Patent
Apicella (10) Patent No.: US 10,739,984 B1
(45) Date of Patent: Aug. 11, 2020

(54) SYSTEM FOR DETECTION OF INPUT DEVICE

(71) Applicant: AMAZON TECHNOLOGIES, INC., Seattle, WA (US)

(72) Inventor: Nicola Apicella, Iasi (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 211 days.

(21) Appl. No.: 15/664,742

(22) Filed: Jul. 31, 2017

(51) Int. Cl.
*G06F 3/0487* (2013.01)
*G06F 3/0354* (2013.01)
*G06F 3/0489* (2013.01)

(52) U.S. Cl.
CPC ........ *G06F 3/0487* (2013.01); *G06F 3/03543* (2013.01); *G06F 3/0489* (2013.01)

(58) Field of Classification Search
CPC ... G06F 3/0487; G06F 3/03543; G06F 3/0489
See application file for complete search history.

(56) References Cited

U.S. PATENT DOCUMENTS

| 2005/0179647 | A1* | 8/2005 | Simmons | G06F 3/023 345/156 |
| 2006/0139312 | A1* | 6/2006 | Sinclair, II | G06F 3/0481 345/156 |
| 2006/0209016 | A1* | 9/2006 | Fox | G06F 3/038 345/156 |
| 2010/0007613 | A1* | 1/2010 | Costa | G06F 1/1601 345/173 |
| 2010/0070872 | A1* | 3/2010 | Trujillo | G06F 3/04892 715/745 |
| 2013/0159784 | A1* | 6/2013 | Rossi | G06F 11/3684 714/47.1 |
| 2013/0187855 | A1* | 7/2013 | Radakovitz | G06F 3/0488 345/163 |
| 2013/0191779 | A1* | 7/2013 | Radakovitz | G06F 9/451 715/800 |
| 2014/0354554 | A1* | 12/2014 | Devi | G06F 3/0488 345/173 |

(Continued)

OTHER PUBLICATIONS

Leonie Watson "How do you detect a screen reader?" May 16, 2011 8 pages (Year: 2011).*

(Continued)

*Primary Examiner* — Andrea N Long
(74) *Attorney, Agent, or Firm* — Lindauer Law, PLLC (57) ABSTRACT

During a session in which a user is interacting with a user interface, event data is acquired about user inputs to the user interface. The user interface may include a web page. This event data indicative of keystrokes, mouse clicks, mouse movement, and shifts in focus is processed to generate a score. Event data associated with keystrokes and mouse clicks increase the score while events associated with mouse movement decrease the score. A score above a threshold is indicative of a keyboard user, while a score below the threshold is indicative of a pointer user. For example, a keyboard user may be utilizing an assistive technology such as a screen reader application to interact with the user interface. Metrics indicative of whether the user is a pointer or keyboard user may be determined and used to guide website design, change the user interface being presented, and so forth.

20 Claims, 7 Drawing Sheets

(56) References Cited

U.S. PATENT DOCUMENTS

| | | | | |
|---|---|---|---|---|
| 2014/0368421 | A1* | 12/2014 | Smus | G06F 3/038 |
| | | | | 345/156 |
| 2015/0088955 | A1* | 3/2015 | Hendrick | G06Q 30/02 |
| | | | | 709/201 |
| 2015/0220151 | A1* | 8/2015 | Violet | G06F 3/0483 |
| | | | | 715/777 |
| 2015/0220417 | A1* | 8/2015 | Diment | G06F 11/3438 |
| | | | | 709/224 |
| 2015/0287043 | A1* | 10/2015 | Michaelis | G06Q 10/063 |
| | | | | 705/317 |
| 2019/0026072 | A1* | 1/2019 | Miron | G06F 3/167 |

OTHER PUBLICATIONS

U. Kukreja, W. E. Stevenson, and F. E. Ritter. RUI: Recording user input from interfaces under windows and mac os x. Behavior Research Methods, 38(4):656--659, 2006. (Year: 2006).*

* cited by examiner

SYSTEM FOR DETECTION OF INPUT DEVICE

BACKGROUND

A computing device presents a user interface to a user. The user interfaces are commonly graphical user interfaces in which various elements are presented visually on a display screen. The user may provide input using a keyboard, mouse, touch sensor, and so forth. Users with a visual or physical disability may seek to use the user interface.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Described in this disclosure are techniques for determining an input mode, such as keyboard or mouse that is being used by a user of a user interface. The user interface may be provided by a web browser that renders web pages.

Some users may have disabilities that may result in some features of a user interface being challenging to access or unusable. To compensate, these users may utilize various assistive software while interacting with a user interface. For example, a visually impaired user using a web browser running on their computing device, such as a laptop, may install a screen reader application that provides audible output and accepts keyboard input.

Traditionally, the user interface of a web browser or other application may be uninformed as to the presence of a screen reader or other assistive software that is in use. Assistive software may interpose itself between the operating system of the computing device and the application. This assistive software may perform functions such as simulating mouse clicks, scroll actions, and so forth, based on keyboard input instead of input associated with a pointing device. A user may thus be a "keyboard user" in which their primary method of input is using a keyboard or a "mouse user" in which input is provided using a mouse or other pointing device.

The techniques described in this disclosure generate classification data that indicates a session or portion thereof in which a user is interacting with a user interface via keyboard only, such as would be produced by a screen reader or other assistive software, or using a mouse. The classification data may be acquired and used to modify the design of the user interface. For example, based on information that users are accessing a web page via an input mode of keyboard only, the web page may be modified to facilitate access in that keyboard only mode. In another example, a content server may be configured to use the classification data to determine which version of the web page to deliver to the browser. Continuing this example, a browser operating with keyboard only input may receive a version of the web page that is optimized for keyboard input.

The classification data may be generated on an ongoing basis. For example, over a span of web browsing that lasts an hour, the classification data may be updated to indicate the mode of input being used. This ongoing assessment provides flexibility for situations where different users may be using the same computing device. For example, a visually impaired user may perform more user interface interactions themselves, but may ask a sighted helper to complete a function that is not readily accessible. The system described herein is able to detect the transition from one input mode (keyboard only as used by the disabled user) to another input mode (keyboard and mouse as used by the sighted helper).

The classification data associated with a web browser may be generated by using data obtained from a key logger module, mouse logger module, and focus logger module. Output from these modules is assessed and used to generate the classification data.

The key logger module is used to obtain key logger data about keyboard events, such as keypresses, key combinations, and so forth and emit this key logger data. The key logger module may be configured to filter out or omit keypresses associated with input text areas. For example, the key logger module would not record the user typing a name into a name field of a web page.

The mouse logger module obtains data about mouse inputs and generates mouse logger data. As used in this disclosure "mouse" may include pointing devices, such as trackballs, touch sensors, digitizers, cameras, and so forth. These pointing devices may provide information indicative of a position of a device or part of the user in a two or three-dimensional space, motion, and so forth. The mouse logger module may filter or otherwise omit pseudo-movements such as scroll movements or changes in focus that may be due to pseudo-movements. For example, in some situations a web browser may generate a scroll mouse movement because a user has tabbed from one field to another field that is further down the page. In another example, the user may tab or otherwise change the focus from one element to another that generates a mouse movement, even when the mouse was not actually moved.

The focus logger module obtains data about the focus of the user interface. For example, data may be obtained indicative of the component having focus a particular time, changes to the focus, and so forth. Focus is indicative of the component of the graphical user interface that is currently selected to receive input. For example, a user interface may have a first input text area for a first name and a second input text area for a last name. If the first input text area is in focus, then keypresses on the keyboard may be provided to that first input text area.

Event data is produced that is indicative of the key logger data, mouse logger data, and focus logger data. For example, the event data may comprise a time series containing data that is indicative of a timestamp and type for the events indicated in the logger data.

A scoring module processes the event data to generate an initial score that is associated with a particular event. The initial score may then be processed to account for various situations that may occur. For example, if a transition is detected from keyboard only mode to mouse mode, a fast decay module may be used to produce a first adjusted score. The first adjusted score may have a value that is less than the value of the initial score. For example, the fast decay module may utilize an exponential function to decrease the initial score. The fast decay module facilitates the classification being quickly responsive to mouse movements. For example, two movement events may be sufficient to drop the first adjusted score below a threshold value that indicates the mode in use is keyboard only.

If no transition from keyboard only mode to mouse mode is detected, a fast recovery module may be used to produce a second adjusted score. The fast recovery module allows the system to quickly determine that a keyboard only mode is in use and transition quickly from mouse mode to keyboard only mode.

The adjusted score is then compared to a threshold value. If the score is greater than or equal to the threshold value, the current input mode may be deemed to be that of a keyboard only mode. If the score is less than the threshold value, the current input mode may be deemed to be that of a mouse mode.

As described above, the classification data may then be used to provide information to a user interface designer, website operator, or other party about the input mode being used. In conjunction with other metric data, this information may be used to improve the performance and functionality of the user interface. The classification data may also be used to select or otherwise modify the presentation of the user interface. For example, if the classification data indicates that a keyboard only mode, the web page or subsequent web pages may be delivered in a format or configuration that is more easily navigated in that mode.

By using the classification data, user interfaces such as web pages may be engineered to more efficiently and effectively present information to users. The classification data may also be used to present a particular user interface that requires less network bandwidth to transfer. For example, a user operating in keyboard only mode may receive a webpage that does not include images, thus eliminating the transmission of unnecessary data and improving network performance and minimizing data requirements by the computing device.

Illustrative System

Figure 1:
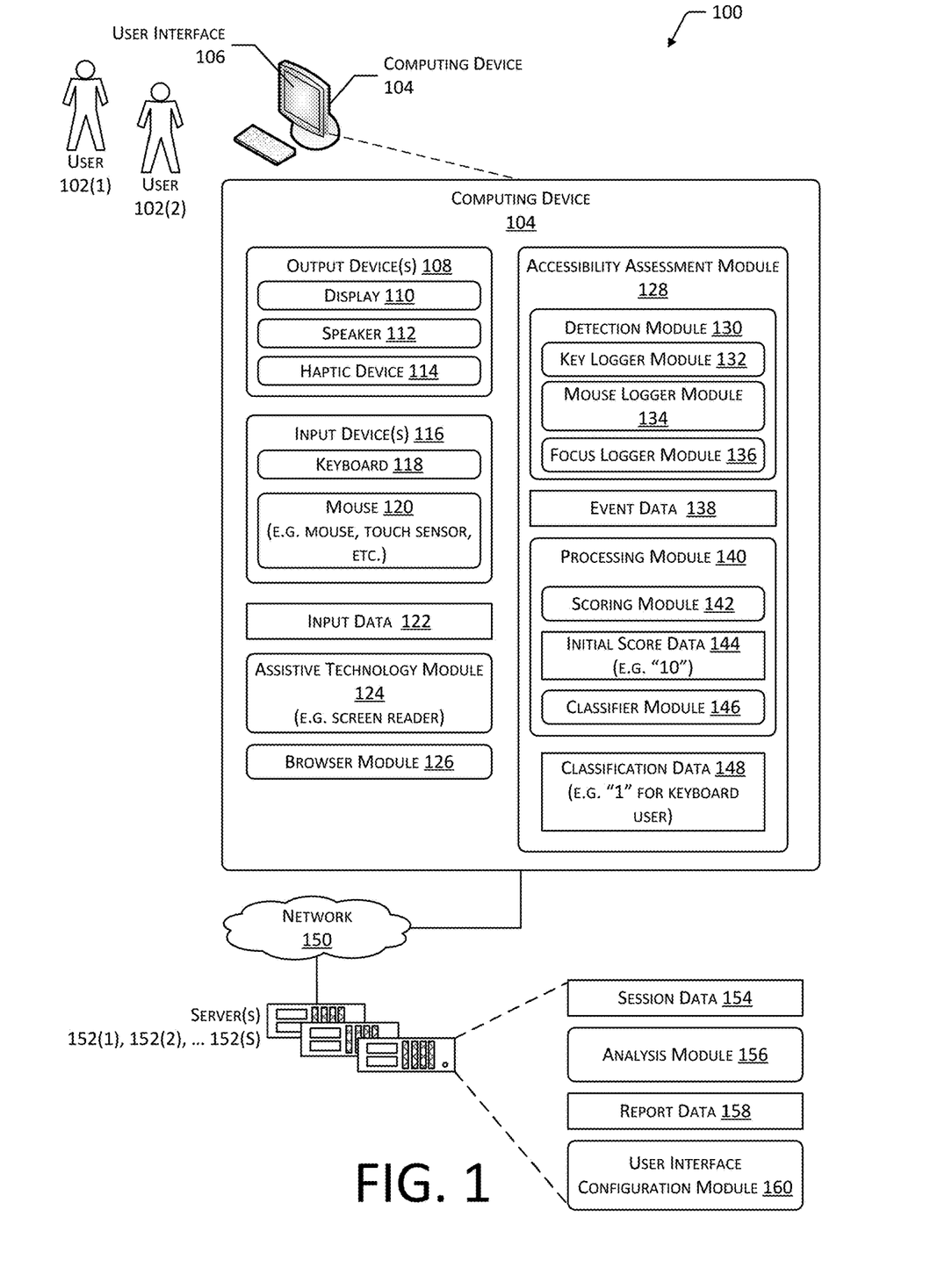
FIG. 1 illustrates a system to determine an input mode in use by a user by analyzing key, mouse, and focus data associated with a user interface, according to some implementations.

FIG. 1 illustrates a system 100 to determine an input mode in use by a user by analyzing key, mouse, and focus data associated with a user interface, according to some implementations. The user interface may be presented on a device such as a desktop computer, laptop computer, and so forth. The input mode used by a user is indicative of what type of input device or devices being utilized to provide input to a user interface. For example, a keyboard only input mode occurs when the user provides input using only a keyboard or equivalent device. In comparison, a mouse input mode utilizes a pointing device such as a mouse, touch sensor, digitizer, and so forth that may be used by itself or in conjunction with a keyboard.

Some users may utilize assistive software while interacting with a user interface. For example, a visually impaired user may install a screen reader application on their desktop computer. The screen reader application provides audible output and accepts keyboard input. Because the visually impaired user is unable to see where the mouse pointer is on a display screen, they may instead use keyboard commands to navigate. For example, this user may use the tab or arrow keys to step through different controls in the user interface, with the screen reader presenting audio that is indicative of the function for those controls.

As part of the operation of screen readers and other assistive software, the application providing the user interface may not have information as to whether that assistive software is in use. For example, the assistive software processes inputs from input devices such as a keyboard, mouse, sip-and-puff device, and so forth. The assistive software may then process those inputs and either disregard them or convert them into other inputs. For example, based on keyboard input the assistive software may generate mouse clicks, mouse scrolls, and so forth.

This system 100 allows for the determination of the input mode used by one or more users 102(1), 102(2), . . . , 102(N). A user 102 uses a computing device 104 that presents a user interface 106. The user interface 106 may be presented using one or more output devices 108 of the computing device 104. The output devices 108 may include one or more of a display 110, speaker 112, haptic device 114, and so forth. The display 110 may comprise a light emitting diode display, liquid crystal display, electrophoretic display, and so forth. The display 110 provides visual output. The speaker 112 may comprise an air conduction speaker or bone conduction speaker that provides mechanical vibrations. The haptic output device 114 may provide a tactile output by one or more of vibration, physically changing shape or position, emitting electrical signals to stimulate human nerves, temperature change, and so forth.

The user 102 may provide input to the user interface 106 using one or more input devices 116 of the computing device 104. The input devices 116 may include one or more of a keyboard 118, mouse 120, and so forth. The keyboard 118 may comprise one or more keys having switches that may be activated or deactivated to change a signal that is indicative of the input. The keyboard 118 may contains keys arranged in various formats, such as a standard alphanumeric computer keyboard with 101 to 104 keys in a QWERTY or Dvorak layout. In other implementations, the keyboard 118 may comprise a chorded keyboard that uses combinations of presses to designate one or more particular characters.

The mouse 120 comprises a pointing device. For ease of discussion, and not necessarily as a limitation, unless otherwise specified "mouse" is used to indicate a pointing device that provides data such as a set of coordinates, a directional vector, and so forth. This may include pointing devices such as a mechanical or optical mouse, digitizer, touch sensor, light pen, joystick, camera, inertial measurement units, and so forth. For example, a camera may be used to track hand, finger, eye, or limb movements of a user to provide input.

The input devices 116 are used to acquire input data 122. For example, the input data 122 may comprise information indicative of particular keys pressed, particular movements from the mouse 120, and so forth.

The computing device 104 includes one or more hardware processors with memory storing instructions. The memory may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory provides storage of computer-readable instructions, data structures, program modules, and other data associated with the operation of the computing device 104.

The memory may store one or more of the following modules. These modules may be executed at least in part on the one or more hardware processors. For example, an operating system module may manage hardware resources such as the hardware processors, memory, output devices 108, input devices 116, and so forth.

An assistive technology module 124 may provide functions that aid the user 102 in operating the computing device 104. For example, the assistive technology module 124 may provide functions such as converting text presented on the display 110 to speech for output via the speaker 112.

A browser module 126 may be used to present a user interface 106. For example, the browser module 126 may receive data such as a hypertext markup language (HTML) webpage, and use that information to present the user interface 106. The browser module 126 may receive data from a service or other module executing on the computing device 104, or from an external source such as from a web server accessed via the internet.

During operation of the computing device 104, the user 102 may use the input devices 116 to generate input data 122. The operating system may provide the input data 122 to the assistive technology module 124. The assistive technology module 124 may process the input data 122 and pass this along to other modules, such as the browser module 126. For example, the assistive technology module 124 may convert input data 122 associated with a keyboard input, such as pressing a particular key, into an event associated with a mouse action, such as a click. The operation of the assistive technology module 124 may thus obscure from the browser module 126 or other modules information about the input mode currently in use by the user 102.

An accessibility assessment module 128 may be stored in the memory and executed on the one or more hardware processors. The accessibility assessment module 128 includes a detection module 130. The detection module 130 is used to detect information about events associated with operation of the input devices 116 and the browser module 126 or other modules. The detection module 130 includes a key logger module 132, a mouse logger module 134, and a focus logger module 136. In some implementations, the detection module 130 or portions thereof may be executed within or by the browser module 126.

The key logger module 132 is used to obtain event data 138 or key logger data that is indicative of keyboard events, such as keypresses, key combinations, and so forth. The key logger module 132 may be configured to filter out or omit keypresses associated with input text areas. For example, the key logger module 132 would not record the user 102 typing a name into a name field of a web page.

The mouse logger module 134 obtains event data 138 or mouse logger data about mouse inputs. The event data 138 may be indicative of a position of a device or part of the user in a two or three-dimensional space, motion, and so forth. The mouse logger module 134 may filter or otherwise omit pseudo-movements. For example, the mouse logger module 134 may remove or prevent from writing event data 138 about actions such as scroll movements or changes in focus that may be due to pseudo-movements. For example, a pseudo-movement comprises a mouse input that is not produced as the result of an actual physical input made to a pointing device. Continuing the example, in some situations the browser module 126 may generate a scroll mouse movement because the user 102 has tabbed from one field to another field that is further down the page. In another example, the user 102 may tab or otherwise change the focus from one element to another that generates a mouse movement, even when the mouse 120 was not actually moved.

The focus logger module 134 obtains data about the focus of the user interface 106. For example, data may be obtained indicative of a component of the user interface 106 having focus a particular time, changes to the focus, and so forth. Focus is indicative of the component of the graphical user interface 106 that is currently selected to receive input. For example, the user interface 106 may have a first input text area for a first name and a second input text area for a last name. If the first input text area is in focus, then keypresses on the keyboard 118 are provided to or otherwise associated with that first input text area.

In some implementations one or more of the logger modules may be implemented as scripts. These scripts may be injected into code associated with the user interface 106, such as a web page. For example, a web server may inject the script that comprises the key logger module 132 into a web page being delivered to the computing device 104.

The detection module 130 generates event data 138. The event data 138 comprises information indicative of a particular input and may include information such as a timestamp, time value, sequence number, and so forth. In some implementations the event data 138 may be a digest or otherwise processed version of the log data. For example, the key logger module 132 may generate event data 138 that is indicative of input of particular non-character keys such as control key combinations, arrow keys, and so forth, but indicate any alphabetic keypress as the same, regardless of the actual letter key pressed during input. As described above, the logger modules may provide some filtering or pre-processing of the input data 122. The event data 138 may thus provide information about a subset of the inputs provided by the user 102, along with information that may be used to determine if one event occurred before, during, or after another event.

The event data 138 is provided to a processing module 140. The processing module 140 includes a scoring module 142 that processes at least a portion of the event data 138 to determine initial score data 144. The initial score data 144 may then be subsequently processed by a classifier module 146 to generate classification data 148. In one implementation, the classification data 148 provides information as to the input mode associated with the event data 138 for a portion of a session is indicative of an input mode. For example, the classification data 148 may comprise a binary value in which "0" is indicative of a mouse input mode and "1" is indicative of a keyboard only input mode.

In some implementations, the processing module 140 may execute as a process within the browser module 126. For example, the processing module 140 may comprise one or more scripts that are executed by scripting engine associated with the browser module 126. Operation of the processing module 140 and associated modules such as the scoring module 142 and the classification module 146 are described in more detail in the following figures.

The functions provided by the different modules allow for changes to be made in one module without adversely affecting operation of the others. For example, the key logger modules 132, mouse logger module 134, and focus logger module 136 may be left unchanged while the classifier module 146 is changed to utilize machine learning techniques, such as a neural network, trained classifier, and so forth. In another example, additional modules such as a three-dimensional hand tracking logger module may be added to facilitate input provided by the movements of the user's hands.

The computing device 104 may include a communication interface that allows for communication with a network 150. For example, the computing device 104 may be connected to a wired or wireless local area network that in turn is connected to a wide area network such as the Internet which in turn provides communication to one or more servers 152(1), 152(2), . . . , 152(S). One or more of the servers 152 may be configured to acquire or access session data 154. Session data 154 may comprise information associated with an interaction or exchange of data between the computing device 104 and one or more of the servers 152. For example, the session data 154 may be indicative of particular web pages served, interactions between the user 102 and the user interface 106 while the user interface 106 is being presented by the computing device 104, and so forth.

One or more of the servers 152 may utilize an analysis module 156 that processes information such as the session data 154, the classification data 148, and so forth. For example, the analysis module 156 may generate report data 158 such as metrics indicative of those components of the user interface 106 that were interested with, what the input mode was as indicated by the classification data 148, and so forth. The report data 158 may be used by a programmer, administrator, automated system, and so forth. For example, the report data 158 may be used to tailor or adjust the programming of a web page to improve its accessibility to users operating a particular input mode.

The classification data 148 that indicates the input mode used by a user may be useful to programmers, web site operators, or others who design and maintain user interfaces. This classification data 148 may be used to improve user interfaces, determine which user interfaces may require modification, and so forth. For example, a web browser may present a user interface comprising a website. Metrics about the use of the website may be gathered and used for improvement of the website. By having classification data 148 about the input mode used during a session with the website, new insights may be found and used to further improve the website. Continuing the example, with this classification data 148, a website designer may be able to determine that users 102 operating with a keyboard only input mode are leaving a particular web page before completing an action. Based on this information, the web page may be redesigned to allow such a keyboard only input mode to more easily navigate and complete the action.

One or more of the servers 152 may implement a user interface configuration module 160. The user interface configuration module 160 may be configured to utilize classification data 148 to dynamically select or change the user interface 106 that is being presented on the computing device 104. For example, the classification data 148 indicates that the user 102 is a keyboard only user, a version of the user interface 106 that is specifically designed for keyboard only use may be presented on the computing device 104.

In some implementations, one or more of the functions of the detection module 130 or the processing module 140 may be performed at least in part by one or more of the servers 152. For example, the session data 154 may include event data 138 that is been sent to the one or more servers 152. The processing module 140 may then be executed on one or more the servers 152 to generate the classification data 148.

Figure 2:
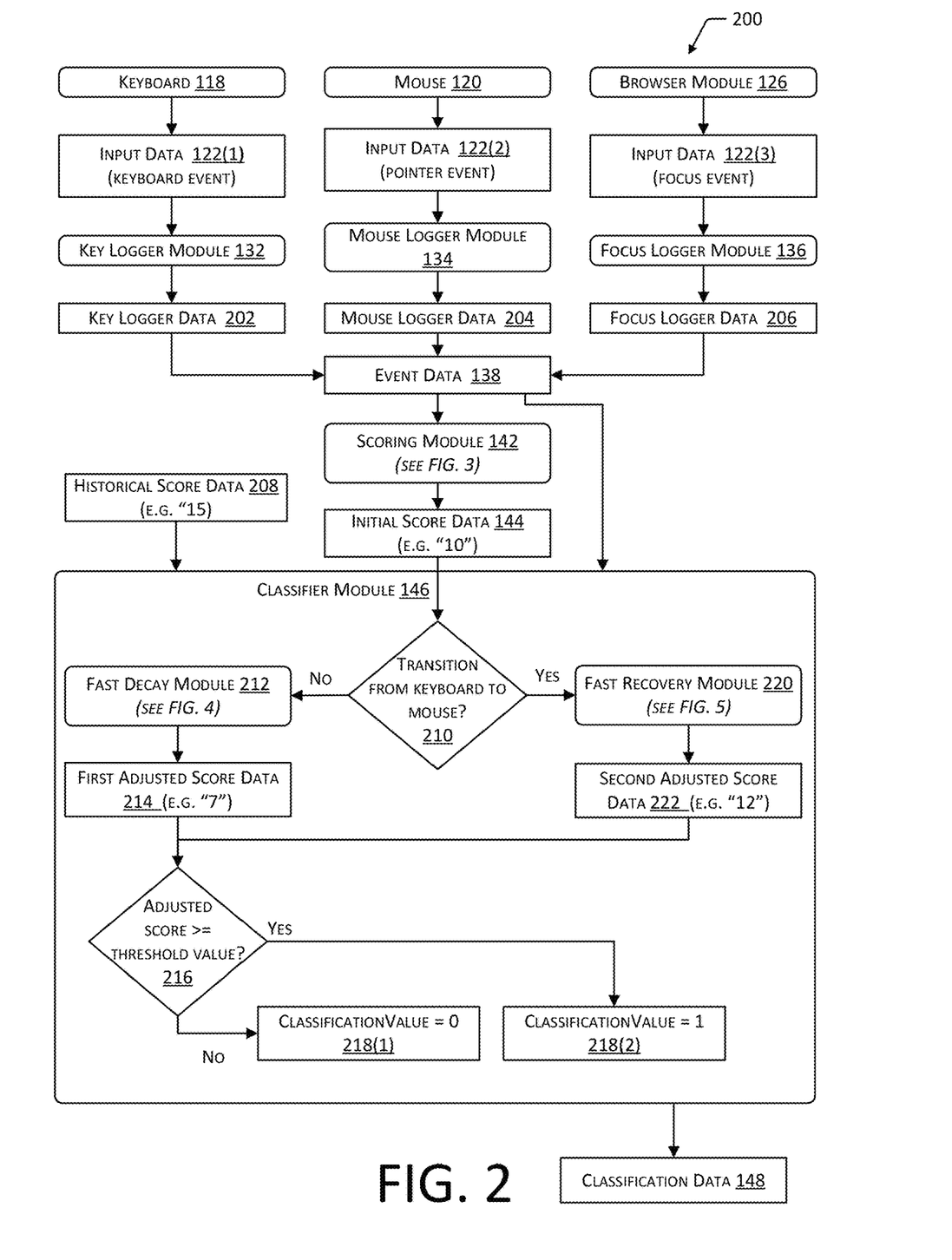
FIG. 2 illustrates a flow diagram of a process of generating classification data that is indicative of an input mode such as keyboard or mouse, according to some implementations.

FIG. 2 illustrates a flow diagram 200 of a process of generating classification data 148 that is indicative of an input mode such as keyboard only or mouse, according to some implementations.

As described above, input device(s) 116 produce input data 122. For example, the keyboard 118 produces input data 122(1) such as keyboard events indicative of keypresses, the mouse 120 produces input data 122(2) such as pointer events indicative of a click at particular coordinates, and the browser module 126 may generate input data 122(3) such as focus events.

The input data 122 is processed by the associated logger module. The input data 122(1) from the keyboard 118 is processed by the keylogger module 132 and used to produce key logger data 202. For example, the key logger data 202 may comprise data indicative of keypresses or combinations of keys that are pressed, but which has filtered out keypresses associated with input text areas. The input data 122(2) from the pointing device such as the mouse 120 is processed by the mouse logger module 134 to produce mouse logger data 204. For example, the mouse logger data 204 may comprise information indicative of the mouse location, mouse movement, mouse button click event, and so forth. The mouse logger module 134 may be configured to filter out particular pieces of input data 122, such as scroll events. This is because in some implementations software such as the assistive technology module 124 may generate pseudo-input such as generating mouse scroll input data responsive to a keyboard input. The input data 122(3) from the browser module 126 is processed by the focus logger module 136 and used to produce focus logger data 206. For example, the input data 122(3) may indicate a component within the user interface 106 that is in focus at a first time, and a different component within the user interface 106 that is in focus at a second time. The focus logger module 136 may use this input data 122(3) about focus events to generate the focus logger data 206 that is indicative of a change in focus.

The event data 138 may comprise one or more of the keylogger data 202, the mouse logger data 204, or the focus logger data 206. The event data 138 may then be processed by the scoring module 142 to generate initial score data 144. Operation of the scoring module 142 is described in more detail below with regard to FIG. 3. In some implementations, the initial score data 144 may be indicative of a score representative of the input mode given the events occurring at a particular time or period of time.

One or more of the keylogger module 132, the mouse logger module 134, or the focus logger module 136 may be configured to not process the input data 122 in real time. For example, it may be desirable to provide priority in the processing of the input data 120 before other processes, such as the browser module 124 to avoid introducing a latency in the typical operation of the browser module 126. The accessibility assessment module 128 may not be particular sensitive to latency, and as such the event data 138 may be provided at a slight delay. In one implementation, one or more of the logger modules may delay their processing by pushing input data 122 associated with a particular input into an event queue. That input data 122 may then be subsequently processed from the event queue at a later time.

The initial score data 144 is then processed by classifier module 146. The classifier module 146 may access historical score data 208. The historical score data 208 may comprise information such as a score previously calculated by the classifier module 146. In some implementations, data such as the historical score data 208 may be stored and retrieved for later use. For example, the historical score data 208 may be stored as a cookie or other object by the browser module 126. During subsequent operation of the browser module 126, the historical score data 208 may then be used as described herein.

At 210, the classifier module 146 may determine if the initial score data 144 is indicative of a transition from keyboard only to mouse input modes. For example, the initial score data 144 may be compared to a threshold value and the historical score data 208. Continuing the example, if the initial score data 144 is above the threshold value, the current input mode may be deemed to be that of a keyboard only mode. In this example, if the previous historical score data 208 indicates that the last input mode was keyboard only, a 210 the determination is made that the input mode has transitioned from a keyboard only input mode to a mouse input mode.

The classifier module 146 is configured to dynamically adjust such that changes in the input mode may be readily detected. If at 210 no transition from keyboard only input mode to mouse input mode is determined, the process proceeds to 212. At 212 a fast decay module is utilized to generate first adjusted score data 214 that is less than the initial score data 144. By utilizing the fast decay module 212, the resulting score changes quickly allowing for the classifier module 146 to be more responsive to changes in the input mode. The first adjusted score data 214 may then be assessed against a threshold value at 216. The threshold value may be specified, such as by an administrator or end user, or may be determined using one or more techniques. For example, the threshold may value may be determined using one or more machine learning techniques based on a set of training data.

If at 216 the adjusted score is greater than or equal to the threshold value, the classifier module 146 may generate a classification value 218(2) that is indicative of a keyboard only input mode, such as a "1" value. In comparison, if at 216 the adjusted score is less than the threshold value, the classifier module 146 may generate a classification value 218(1) that is indicative of a mouse input mode that may include both mouse and keyboard inputs.

The classifier module 146 may then generate the classification data 148 that includes or is otherwise representative of the classification value 218 that has been determined. The classification data 148 may be utilized by one or more of another module executing on the computing device 104, on one or more of the servers 152, and so forth.

In some implementations, the classifier module 146 may utilize other data processing techniques. For example, the classifier module 146 may utilize a neural network that has been trained using previously obtained event data 138.

Figure 3:
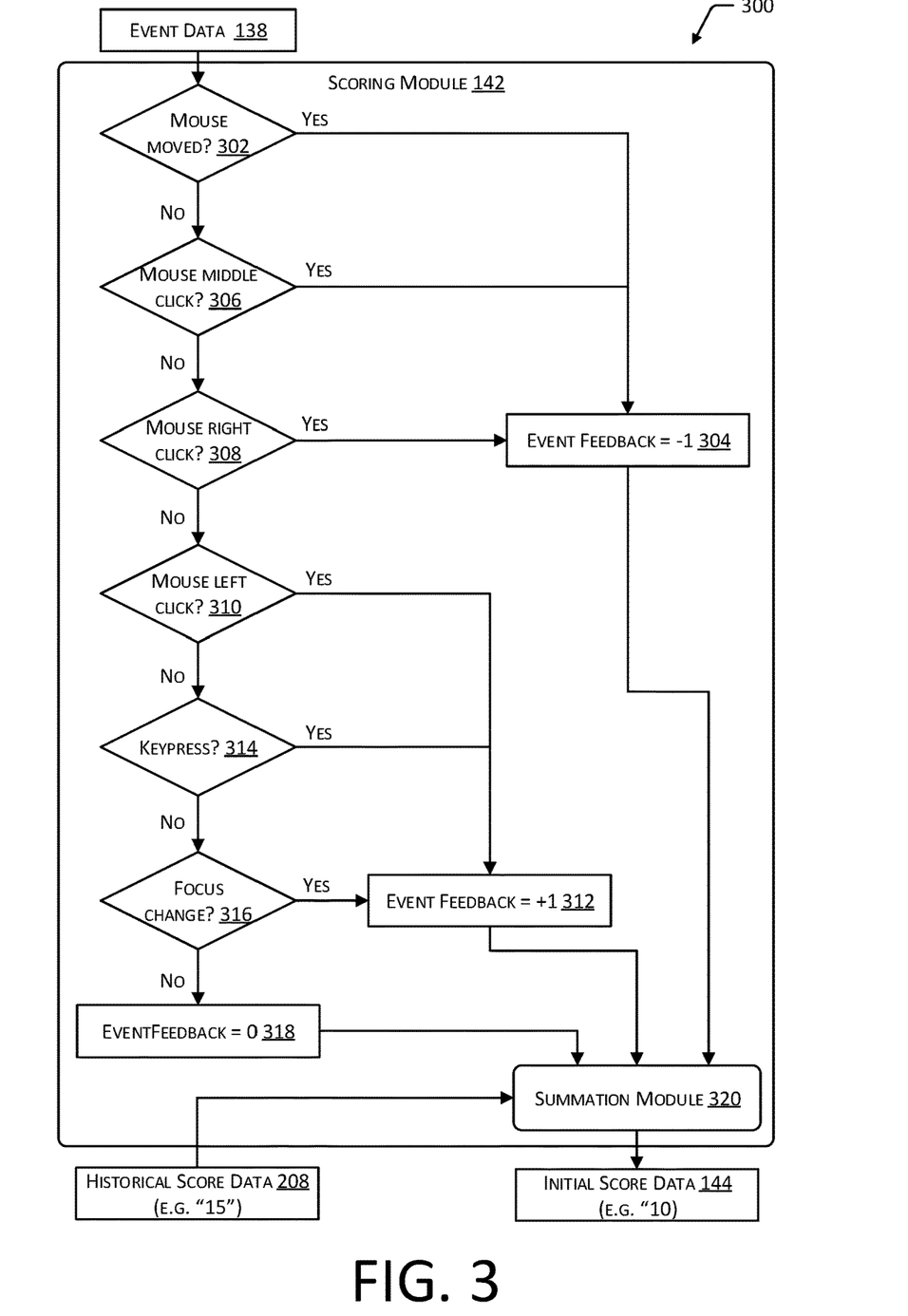
FIG. 3 illustrates a flow diagram of a scoring module that determines initial score data, according to some implementations.

FIG. 3 illustrates a flow diagram 300 of the scoring module 142 that determines the initial score data 144, according to some implementations. The scoring module 142 may process the event data 138 or portion thereof as described next. For example, the scoring module 142 may process the event data 138 obtained since the previous determination of classification data 148. The flow diagrams in this disclosure may be described in terms of a series of comparisons or decision blocks by way of illustration and not necessarily as a limitation. In other implementations, logical comparison structures such as case statements may be used.

At 302, the event data 138 is processed to determine if the mouse 120 has moved. For example, mouse movement may be determined by a difference between first coordinates indicated by the mouse 120 at a first time and second coordinates indicated by the mouse 120 at a second time. In other implementations, other techniques may be used to determine the mouse movement. If mouse movement is determined, the process may proceed to generate negative event feedback 304. For example, the negative event feedback 304 may have a value of −1. If no mouse movement is determined, the process may proceed to 306.

At 306, the event data 138 is processed to determine if a mouse middle click has taken place. For example, the mouse 120 may include three buttons: left mouse button, a center mouse button, and a right mouse button. In this example, it is assumed that a center mouse button click is associated with use of the mouse 120. As a result, with the determination at 306 of a mouse middle click, the process proceeds to 304 and negative event feedback is generated. Otherwise the process proceeds to 308.

In other implementations, depending upon the operation of the assistive technology module 124, the logic of this and other blocks may be inverted. For example, if the assistive technology module 124 is able to generate a simulated center mouse click based on keyboard input, logic of this block may be reversed.

At 308, the event data 138 is processed to determine if a right mouse click has taken place. Similar to that above with respect to 306, it may be assumed that a right mouse click is associated with the use the mouse 120. If the event data 138 is indicative of a right mouse click the process may proceed to 304 and negative event feedback may be generated. Otherwise, the process may proceed to 310. As above, in other implementations this logic may be inverted.

At 310, the event data 138 is processed to determine if a left mouse click has taken place. It may be assumed that a left mouse click could be generated by the operation of the assistive technology module 124, instead of as a result of a user manipulating a mouse. For example, a screen reader may generate a left mouse click responsive to keyboard input. With the determination of the input being a left mouse click, the process may proceed to generate positive event feedback 312. For example, the positive event feedback 312 may have a value of +1. Otherwise, the process may proceed to 314.

At 314, the event data 138 is processed to determine if a keypress of the keyboard 118 has been received. If so, the process may proceed to generate positive event feedback 312. If not, the process proceeds to 316.

At 316, the event data 138 is processed to determine if there was a change in focus within the user interface 106. If so, the process may generate positive event feedback 312. If not, in the implementation depicted here the process may generate a null or "0" event feedback 318.

A summation module 320 sums the event feedback value 304, 312, or 318 with the historical score data 208 to generate the initial score data 144. For example, the historical score data 208 may comprise the score previously generated by the classifier module 146 as adjusted score data.

As described above, the classifier module 146 may further process the initial score data 144 to generate the classification data 148.

Figure 4:
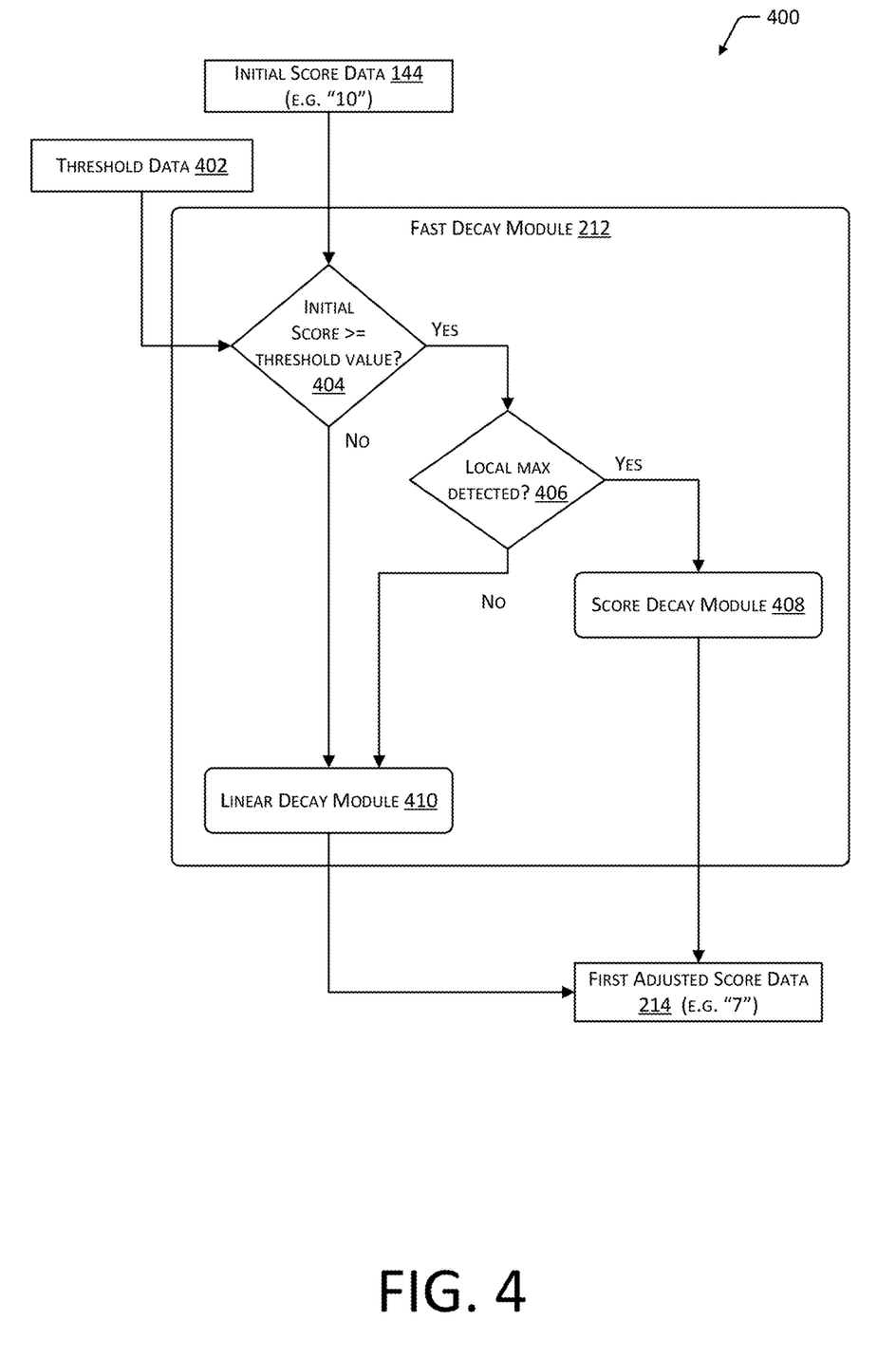
FIG. 4 illustrates a flow diagram of a fast decay module that decreases an initial score under certain conditions, according to some implementations.

FIG. 4 illustrates a flow diagram 400 of the fast decay module 212 that generates adjusted score data having a value that is less than the value of the initial score data 144, according to some implementations. The fast decay module 212 may accept as input the initial score data 144 and threshold data 402. At 404 initial score data 144 is compared to the threshold data 402. If the initial score data 144 is less than or equal to the threshold value, the process may continue to 410. In the implementation depicted here, the first adjusted score data 214 may comprise the initial score data 144 as decreased by a linear decay module 410 using a linear function. In another implementation, the first adjusted score data 214 may have the same value as the initial score data 144. If the initial score data 144 is greater than or equal to the threshold values specified by the threshold data 402, the process proceeds to 406.

At 406, a determination is made as to whether a local maximum of a series of the initial score data 144 is present. For example, a local maximum may be detected by an increase in the score values over time followed by a decrease in the score value from one time to another. If a local maximum is detected, the process proceeds to 408. If no local maximum is detected, the process proceeds to 410 to generate a first adjusted score data 214. In the implementation depicted here, the first adjusted score data 214 may comprise the initial score data 144 as decreased by the linear decay module 410 using a linear function. In another implementation, the first adjusted score data 214 may have the same value as the initial score data 144.

At 408, a score decay module 408 generates first adjusted score data 214 that has a value that is less than a value of the initial score data 144. In one implementation, the score decay module 408 may implement an exponential decay formula. For example $N(t+1)=N(0)*\exp(-lambda*t)$ where $N(0)$ is the score of the local maximum. In other implementations, other techniques may be used to produce the first adjusted score data 214. For example, a linear decay formula may be used.

Figure 5:
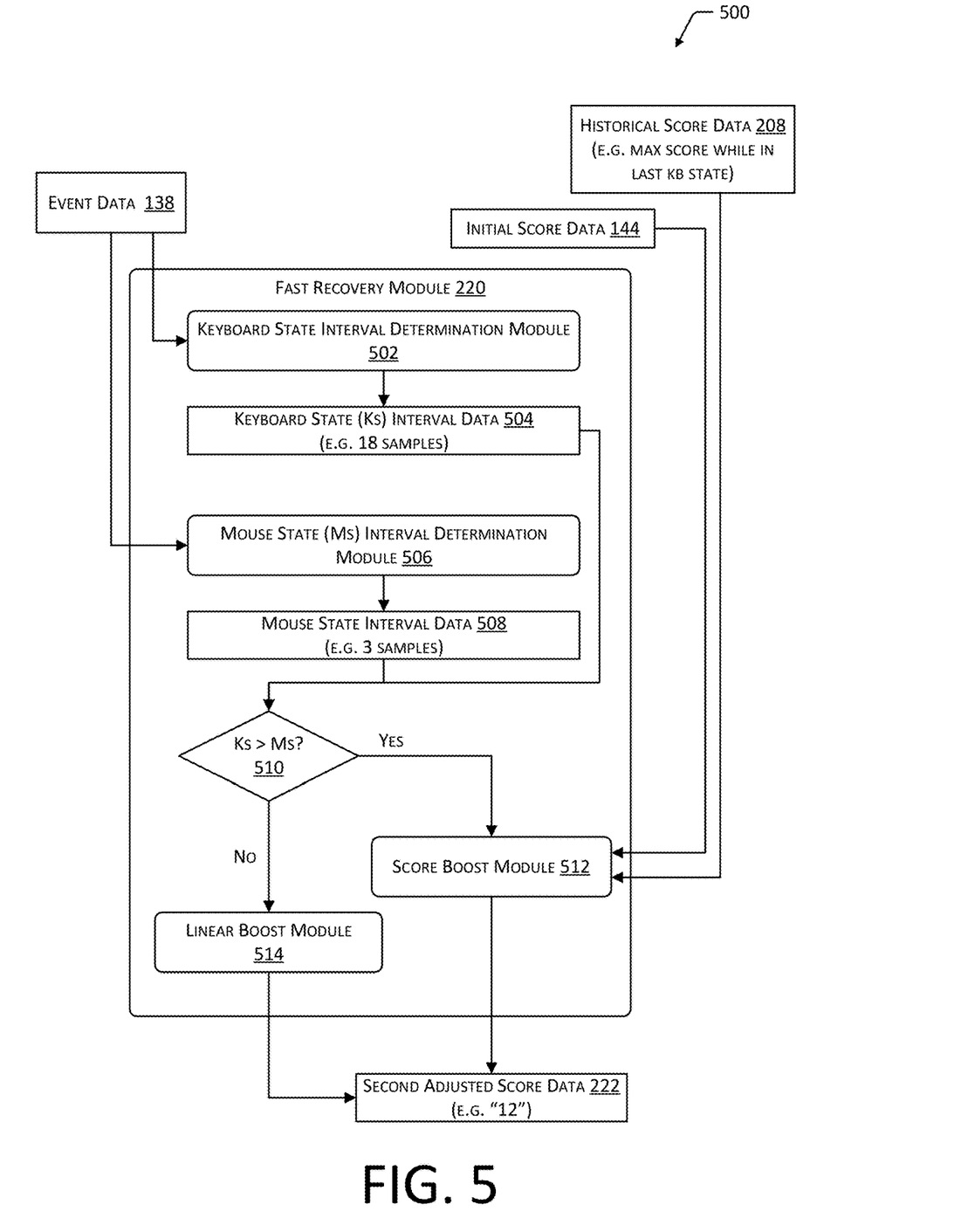
FIG. 5 illustrates a flow diagram of a fast recovery module that increases an initial score under certain conditions, according to some implementations.

FIG. 5 illustrates a flow diagram 500 of the fast recovery module 220 that generates adjusted score data having a value that is greater than the initial score data 144, according to some implementations. The fast recovery module 220 may accept as input the initial score data 144. The initial score data 144 is determined by the scoring module 142, the historical score data 208, and the event data 138.

The fast recovery module 220 takes into account how long a current input mode has existed, compared to a previous input mode. A keyboard state interval determination module 502 uses the event data 138 as described above to determine one or more of classification values 218 or classification data 148. The keyboard state interval determination module 502 determines how long the last period of time during which the last keyboard only input mode was present lasted, as expressed in the keyboard state (Ks) interval data 504. For example, the Ks interval data 504 may be indicative of a count of samples, length of time, and so forth during which the classification value 218 was continuously indicative of a keyboard only input mode.

A mouse state interval determination module 506 performs a similar function to determine mouse state (Ms) interval data 508. For example, the Ms state interval data 508 may be indicative of a count of samples, length of time, and so forth during which the classification value 218 was continuously indicative of a mouse input mode.

At 510, a comparison is made to determine if the Ks interval data 504 indicates an interval that is greater than the Ms interval data 508. With this comparison, the module is assessing if more time has been spent in the keyboard only input mode as compared to the mouse input mode. If so, the process proceeds to 512. If not, the process proceeds to a linear boost module 514 that generates second adjusted score data 222 that comprises the initial score data 144 as increased by the linear boost module 514 using a linear function. In another implementation, the second adjusted score data 222 may have the same value as the initial score data 144.

A score boost module 512 accepts as input the initial score data 144 and the historical score data 208 generates as output second adjusted score data 222 that has a value greater than the initial score data 144. In one implementation, the second adjusted score data 222 may have a value that is equal to the initial score data 144 added to a maximum historical score that occurred in the same session while last in the keyboard only input mode. In other implementations, other techniques may be used to generate the second adjusted score data 222.

Figure 6:
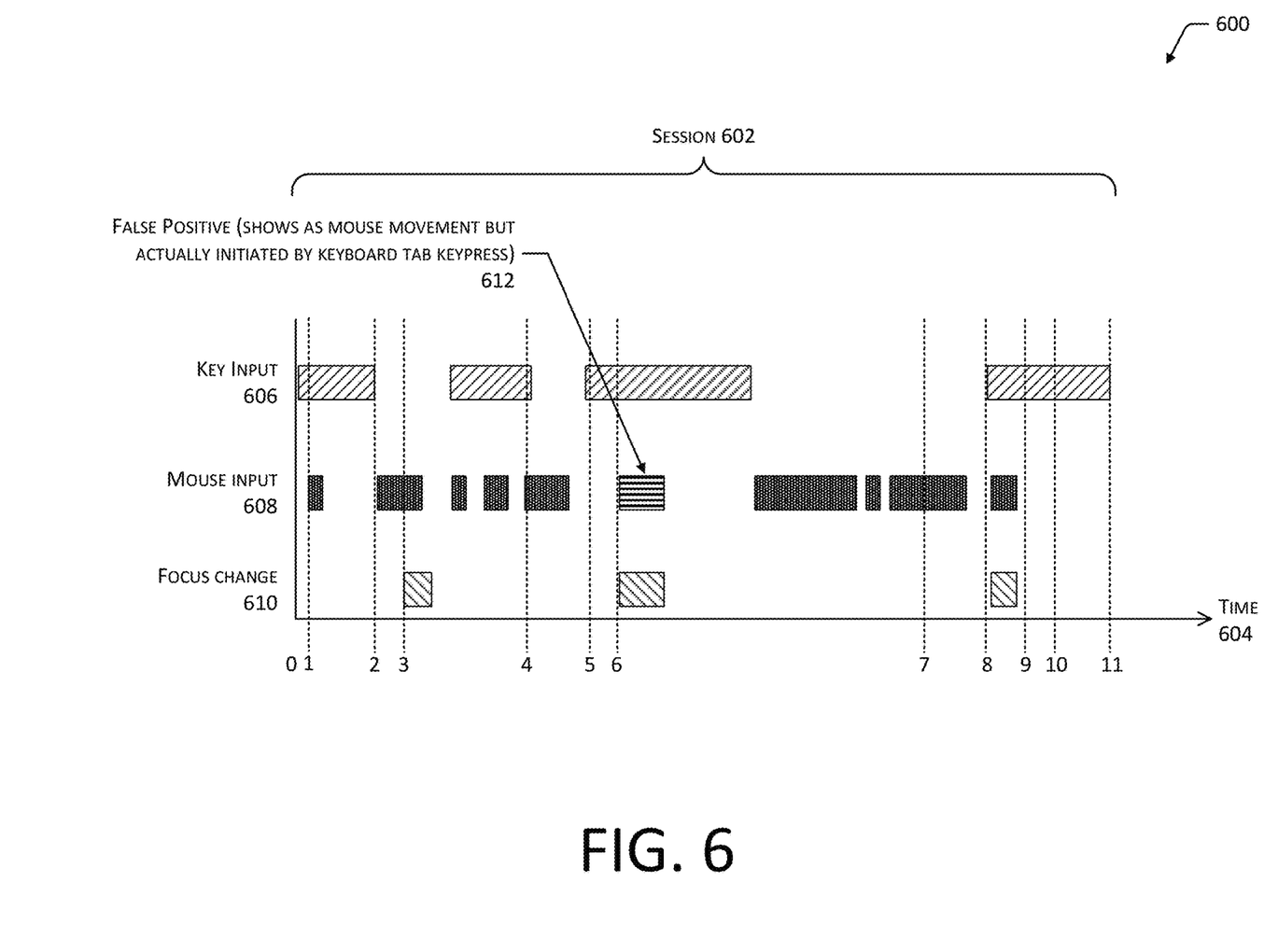
FIG. 6 illustrates a timeline of key, mouse, and focus inputs, according to one implementation.

FIG. 6 illustrates a timeline 600 of key, mouse, and focus inputs, according to one implementation. A session 602 is depicted that comprises a variety of different inputs associated with a user interface 106. For example, the session 602 may comprise the user 102 browsing a webpage.

In this illustration, time 604 increases from left to right along a horizontal axis while a vertical axis indicates key inputs 606, mouse inputs 608, and inputs indicative of focus changes 610. The inputs shown here comprise those prior to processing by the respective log or modules.

As time 604 progresses, the various different inputs are shown. For example, beginning at time 604 0 key input 606 is provided, while mouse input 608 begins to be provided at time 1. As described above, some of the inputs may be pseudo-inputs that are generated by the operating system, the assistive technology module 124, or another process but not produced by the actual input device 116. In this example, at 612 a false positive is shown in the form of a mouse input 608. The input shown at 612 that begins at time 6 is generated by the assistive technology module 124. For example, the screen reader may generate a scroll event responsive to a key input 606 where the user 102 has tabbed from one component in the user interface 106 to another. The user 102 may not actually touch the mouse 120, but instead the assistive technology module 124 generated a mouse scroll event to keep that component present in the portion of the user interface 106 visible. Also note that a focus change 610 also occurs beginning at time 6. With the tab, the focus in the user interface 106 shifted from a first component to a second component.

Figure 7:
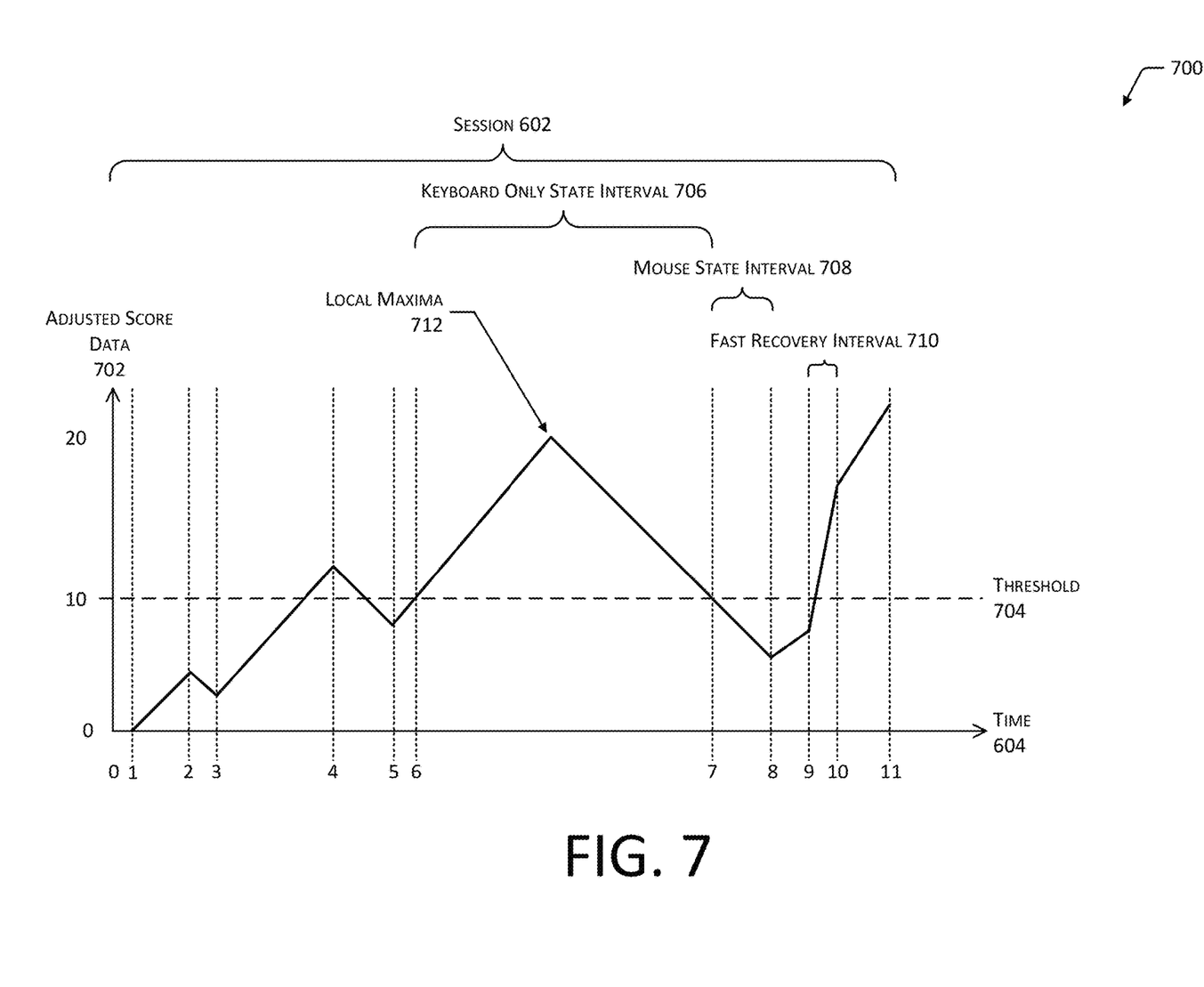
FIG. 7 illustrates the timeline of FIG. 6 showing adjusted score data, according to one implementation.

FIG. 7 illustrates the timeline of FIG. 6, but now showing adjusted score data 702, according to one implementation. As above, time 604 is shown on the horizontal axis increasing from left to right. The adjusted score data 702 comprises one or more of the first adjusted score data 214 or the second adjusted score data 222 as described above.

In this illustration, the threshold 704 is depicted corresponding to an adjusted score value of 10. Scores that are above the threshold 704 may be deemed to be indicative of the keyboard only input mode. Likewise, scores that are below the threshold 704 may be deemed to be indicative of a mouse input mode. As shown here, the adjusted score data 702 changes over time as the user 102 interacts with the user interface 106. A keyboard only state interval 706 is depicted from time 6 to time 7. Returning to FIG. 5 above, where the classifier module 146 is operating on data as of time 6, the duration of the keyboard only state interval 706 is indicated by the Ks interval data 504.

Depicted between time 7 and 8 is a mouse state interval 708. Returning to FIG. 5 above, where the classifier module 146 is operating at on data as of time 6, the duration of the mouse state interval 708 is indicated by the Ms interval data 508.

A fast recovery interval 710 is depicted between time 9 and 10. This fast recovery interval 710 is characterized as shown by FIG. 6 of key inputs 606, no or minimal mouse inputs 608, and a focus change 610. During this interval, the fast recovery module 220 has increased the initial score data 144 to produce a second adjusted score data 222 that has a greater value than that of the initial score data 144.

A local maxima 712 is shown within the keyboard only state interval 706. For example, this local maxima 712 is the point at which the adjusted scores shift from increasing to decreasing. The local maxima 712 may be detected as described above with regard to 406. As illustrated in FIGS. 6 and 7, after time 6 and leading up to the local maxima 712, the key input 606 predominates. The mouse input 608 during this time comprises a false positive 612 that is subsequently removed by the mouse logger module 134 and thus does not become part of the event data 138 that is processed by the scoring module 142. Focus change data 610 also indicates a change in focus beginning at time 6. As a result, positive event feedback 312 is determined by the scoring module 142, leading to an ongoing increase in the adjusted score data 702. As time 604 progresses, after time 6 mouse inputs 608 occur while the key inputs 606 cease. No focus changes 610 are observed during this time. As a result, negative event feedback 304 is generated that begins to decrease the adjusted score, until eventually at time 7 the adjusted score drops below the threshold 704 and the input mode is deemed to transition from keyboard only to mouse.

Because the accessibility assessment module 128 operates in the dynamic fashion described above, it is able to detect a change in input mode resulting from a change of operation by the user 102 or by a different user interacting with the user interface 106. For example, a first user 102(1) may use the keyboard 118 and the assistive technology module 124 to interact with the user interface 106. As a result, the classification data 148 associated with that portion of the session 602 may have a value of "1", indicative of a keyboard only user. The first user 102(1) may ask assistance from a second user 102(2) who then proceeds to interact with the user interface 106 using both the keyboard 118 and the mouse 120. Because of that change in input data 122, the accessibility assessment module 128 is able to determine a change in the input mode and generates new classification data 148 that is indicative of a mouse user, such as a value of "0".

The classification data 148 may be used by the servers 152 to provide report data 158 that may be used to modify the instructions used to generate the user interface 106. The classification data 148 may also be used to select a particular version or implementation of the user interface 106. For example, if the classification data 148 is indicative of a keyboard only input mode, the user interface 106 may be transitioned to present user interface components that are keyboard friendly.

By using the techniques described in this disclosure, the user interface 106 may be improved or otherwise enhanced for users 102 that interact with the user interface 106 using a particular input mode. This may result in a decrease in the amount of computing resources used, such as network bandwidth, processor time, and memory. For example, a visually impaired user 102 who is using an assistive technology module 124 such as a screen reader may be presented with a version of the user interface 106 that omits graphics files, does not include visual user interface components such as menu animations, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a keyboard configured to generate a keyboard event upon activation of one or more keys;
a mouse configured to generate a mouse event upon use of the mouse;
one or more memories storing computer-executable instructions; and
one or more hardware processors to execute the computer-executable instructions to:
present a user interface within a web browser application;
generate key logger data indicative of the keyboard event;
generate mouse logger data indicative of selected types of mouse events;
generate focus logger data indicative of a change in focus from one component of the user interface to another;
generate event data comprising a time series of the key logger data, the mouse logger data, and the focus logger data;
determine, using the event data, initial score data, wherein:
an event indicative of mouse movement results in a score value being negative;
an event indicative of a mouse middle button click results in the score value being negative;
an event indicative of a mouse right button click results in the score value being negative;
an event indicative of no mouse movement and a mouse left button click results in the score value being positive;
an event indicative of a keypress results in the score value being positive;
an event indicative of a focus change results in the score value being positive; and
the initial score data comprises a sum of a value of the initial score data and the score value;
determine an adjusted score that is based at least in part on the initial score data;
determine classification data based on the adjusted score, wherein the classification data is indicative of one of input using only the keyboard or input using the mouse; and
send the classification data to an external device.

2. The system of claim 1, the instructions to determine the adjusted score further comprising instructions to:
determine the initial score data is greater than or equal to a threshold value;
determine a local maximum of the initial score data; and
calculate the adjusted score by multiplying a value of the local maximum by a negative exponent.

3. The system of claim 1, the instructions to determine the adjusted score further comprising instructions to:
determine a first duration of a most recent first interval during which a keyboard only input mode was used to interact with the user interface;
determine a second duration of a most recent second interval during which the mouse was used to interact with the user interface;
determine that the first duration greater than the second duration;
access historical score data indicative of a previous adjusted score; and
generate the adjusted score by adding the initial score data to one half of a maximum score reached during the most recent keyboard only interval.

4. A method comprising:
accessing event data indicative of at least a first input event and a second input event associated with presentation of a user interface;
generating, based on the event data, initial score data that is indicative of whether the first input event is associated with a keyboard input device or a pointer input device and whether the second input event is associated with the keyboard input device or the pointer input device by one or more of:
based on determining one or more of the first input event or the second input event is indicative of movement of the pointer input device, setting the initial score data to a first value;
based on determining the one or more of the first input event or the second input event is indicative of a pointer input device middle button click, setting the initial score data to the first value;
based on determining the one or more of the first input event or the second input event is indicative of a pointer input device right button click, setting the initial score data to the first value;
based on determining the one or more of the first input event or the second input event is indicative of no movement of the pointer input device and a pointer input device left button click, setting the initial score data to a second value;
based on determining the one or more of the first input event or the second input event is indicative of a keypress to the keyboard input device, setting the initial score data to the second value; or
based on determining the one or more of the first input event or the second input event is indicative of a change in focus from a first component of the user interface to a second component of the user interface, setting the initial score data to the second value;
wherein the first value is less than the second value; and
combining one or more of the first value or the second value with historical score data indicative of a previously determined adjusted score to generate the initial score data;
determining adjusted score data based at least in part on the initial score data;
comparing the adjusted score data to a first threshold value; and
generating, based on the comparing, classification data indicative of at least a portion of the at least the first input event and the second input event using a particular input mode.

5. The method of claim 4, wherein the particular input mode is either a keyboard only mode using input obtained from the keyboard input device or a pointer mode using input obtained from the pointer input device.

6. The method of claim 4, further comprising:
receiving input data indicative of a keypress of one or more keys on the keyboard input device; and generating event data indicative of one or more keypresses not associated with input text areas of the user interface.

7. The method of claim 4, further comprising:
receiving input data indicative of an input made using the pointer input device; and
generating event data indicative of an input not associated with a scroll movement.

8. The method of claim 4, further comprising:
receiving input data indicative of a change in focus from a first component to a second component in the user interface; and
generating event data indicative of the change in focus.

9. The method of claim 4, the determining the adjusted score data further comprising:
determining the initial score data is greater than or equal to a second threshold value;
determining a local maximum of historical score data comprising previously determined adjusted scores, wherein the local maximum comprises a value of the previously determined adjusted scores before a decrease in the previously determined adjusted scores; and
calculating the adjusted score data by multiplying the value of the local maximum by a negative exponent.

10. The method of claim 4, further comprising:
determining a first duration of a first interval during which a keyboard only mode was used to interact with the user interface;
determining a second duration of a second interval during which the pointer input device was used to interact with the user interface;
determining that the first duration is greater than the second duration;
accessing historical score data indicative of a previous adjusted score; and
generating the adjusted score data by adding the initial score data to a fraction of a maximum score reached during the first interval.

11. The method of claim 4, further comprising:
generating, using the classification data, metric data indicative of the particular input mode associated with at least a portion of the user interface, wherein the metric data is indicative of one or more of: the particular input mode used or time spent using the particular input mode.

12. The method of claim 4, further comprising generating the event data by:
receiving one or more input events;
pushing the one or more input events into an event queue; and
processing the one or more input events present in the event queue.

13. A system comprising:
one or more memories storing computer-executable instructions; and
one or more hardware processors to execute the computer-executable instructions to:
generate event data using one or more of:
a key logging module that receives input data indicative of a keypress of one or more keys of a keyboard input device and filters keypresses associated with input text areas of a user interface;
a pointer logging module that receives input data indicative of an input using a pointer input device and filters inputs associated with a scroll movement; or
a focus logging module that determines a change in focus from a first component of the user interface to a second component of the user interface;
wherein the event data is indicative of at least a first input event and a second input event associated with presentation of the user interface;
generate, based on the event data, initial score data that is indicative of whether the first input event is associated with the keyboard input device or the pointer input device and whether the second input event is associated with the keyboard input device or the pointer input device;
determine adjusted score data based at least in part on the initial score data;
compare the adjusted score data to a first threshold value; and
generate classification data indicative of at least a portion of the at least the first input event and the second input event using a particular input mode.

14. The system of claim 13, the instructions to generate the initial score data comprising instructions to:
set the initial score data to a first value when:
one or more of the first input event or the second input event is indicative of a pointer movement;
the one or more of the first input event or the second input event is indicative of a pointer input device middle button click; or
the one or more of the first input event or the second input event is indicative of a pointer input device right button click; and
set the initial score data to a second value that is greater than the first value when:
the one or more of the first input event or the second input event is indicative of no movement associated with the pointer input device and a pointer input device left button click;
the one or more of the first input event or the second input event is indicative of a keypress to the keyboard input device; or
the one or more of the first input event or the second input event is indicative of a change in focus from one component of the user interface to another; and
combine one or more of the first value or the second value with previously determined adjusted score data to generate the initial score data.

15. The system of claim 13, further comprising instructions to:
receive one or more input events;
push the one or more input events into an event queue; and
process the one or more input events in the event queue using one or more applications.

16. The system of claim 13, the instructions to determine the adjusted score data further comprising instructions to:
determine the initial score data has a value that is greater than or equal to a second threshold value;
determine a local maximum of the initial score data; and
calculate the adjusted score data by multiplying a value of the local maximum by a negative exponent.

17. The system of claim 13, the instructions to determine the adjusted score data further comprising instructions to:
determine a first duration of a first interval during which a keyboard only mode was used to interact with the user interface;
determine a second duration of a second interval during which the pointer input device was used to interact with the user interface;

determine that the first duration is greater than the second duration;

access historical score data indicative of a previous adjusted score; and generate the adjusted score data by adding the initial score data to a fraction of a maximum score reached during the first interval.

18. The system of claim 13, further comprising instructions to:

discontinue presentation of the user interface; and present a second user interface that is associated with the particular input mode indicated by the classification data.

19. A system comprising:

one or more memories storing computer-executable instructions; and one or more hardware processors to execute the computer-executable instructions to:

access event data indicative of at least a first input event and a second input event associated with presentation of a user interface;

generate, based on the event data, initial score data that is indicative of whether the first input event is associated with a keyboard input device or a pointer input device and whether the second input event is associated with the keyboard input device or the pointer input device;

determine the initial score data has a value that is greater than or equal to a first threshold value;

determine a local maximum of the initial score data;

determine adjusted score data based at least in part on the initial score data by multiplying a value of the local maximum by a negative exponent;

compare the adjusted score data to a second threshold value; and generate classification data indicative of at least a portion of the at least the first input event and the second input event using a particular input mode.

20. A system comprising:

one or more memories storing computer-executable instructions; and one or more hardware processors to execute the computer-executable instructions to:

access event data indicative of at least a first input event and a second input event associated with presentation of a user interface;

generate, based on the event data, initial score data that is indicative of whether the first input event is associated with a keyboard input device or a pointer input device and whether the second input event is associated with the keyboard input device or the pointer input device;

determine a first duration of a first interval during which a keyboard only mode was used to interact with the user interface;

determine a second duration of a second interval during which the pointer input device was used to interact with the user interface;

determine that the first duration is greater than the second duration;

generate adjusted score data by adding the initial score data to a fraction of a maximum score reached during the first interval;

compare the adjusted score data to a threshold value; and generate classification data indicative of at least a portion of the at least the first input event and the second input event using a particular input mode.

\* \* \* \* \*

UNITED STATES PATENT AND TRADEMARK OFFICE
CERTIFICATE OF CORRECTION

Page 1 of 2

PATENT NO. : 10,739,984 B1
APPLICATION NO. : 15/664742
DATED : August 11, 2020
INVENTOR(S) : Nicola Apicella It is certified that error appears in the above-identified patent and that said Letters Patent is hereby corrected as shown below:

In the Claims

Column 15, Claim 1, Line 28:
Currently reads: "another"
Where it should read: --another component of the user interface;--

Column 15, Claim 1, Line 53:
Currently reads: "one of input using only the keyboard or input using"
Where it should read: --one of: input using only the keyboard or input using--

Column 16, Claim 3, Line 4:
Currently reads: "determine that the first duration greater than the second"
Where it should read: --determine that the first duration is greater than the second--

Column 16, Claim 3, Line 11:
Currently reads: "most recent keyboard only interval"
Where it should read: --most recent first interval--

Column 16, Claim 4, Lines 58-60:
Currently read: "indicative of at least a portion of the at least the first input event and the second input event using a particular"
Where they should read: --indicating that at least a portion of the at least the first input event and the second input event uses a particular--

Column 17, Claim 8, Lines 10-11:
Currently read: "receiving input data indicative of a change in focus from a first component to a second component in the user"
Where they should read: --receiving input data indicative of the change in focus from the first component to the second component in the user--

Signed and Sealed this
Sixth Day of October, 2020

Andrei Iancu
*Director of the United States Patent and Trademark Office*

CERTIFICATE OF CORRECTION (continued)
U.S. Pat. No. 10,739,984 B1

Column 17, Claim 11, Lines 45-46:
Currently read: "input mode used or time spent using the particular"
Where they should read: --input mode or time spent using the particular--

Column 17, Claim 12, Line 52:
Currently reads: "processing the one or more input events present in the"
Where it should read: --processing the one or more input events in the--

Column 18, Claim 13, Lines 17-19:
Currently read: "generate classification data indicative of at least a portion of the at least the first input event and the second input event using a particular input mode"
Where they should read: --generate classification data indicating that at least a portion of the at least the first input event and the second input event uses a particular input mode--

Column 18, Claim 14, Lines 40-42:
Currently read: "input event or the second input event is indicative of a change in focus from one component of the user interface to another"
Where they should read: --input event or the second input event is indicative of the change in focus from one component of the user interface to another component of the user interface--

Column 20, Claim 19, Lines 1-3:
Currently read: "generate classification data indicative of at least a portion of the at least the first input event and the second input event using a particular input mode"
Where they should read: --generate classification data indicating that at least a portion of the at least the first input event and the second input event uses a particular input mode--

Column 20, Claim 20, Lines 31-33:
Currently read: "generate classification data indicative of at least a portion of the at least the first input event and the second input event using a particular input mode"
Where they should read: --generate classification data indicating that at least a portion of the at least the first input event and the second input event uses a particular input mode--